(12) United States Patent
Majumdar et al.

(10) Patent No.: US 8,726,955 B2
(45) Date of Patent: May 20, 2014

(54) SELF-BALANCING PNEUMATIC TIRE AND METHOD OF MAKING THE SAME

(75) Inventors: Ramendra Nath Majumdar, Hudson, OH (US); Giorgio Agostini, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 205 days.

(21) Appl. No.: 12/942,583

(22) Filed: Nov. 9, 2010

(65) Prior Publication Data
US 2012/0111462 A1    May 10, 2012

(51) Int. Cl.
*B60C 19/00* (2006.01)
*B60C 19/12* (2006.01)

(52) U.S. Cl.
USPC ........ 152/154.1; 152/503; 152/504; 152/505; 156/123

(58) Field of Classification Search
USPC ........... 152/154.1, 367, 454, 336.1, 502–509, 152/115, 325, 123, 450; 156/123
IPC ..................................... B60C 5/14,9/12, 19/00
See application file for complete search history.

(56) References Cited

U.S. PATENT DOCUMENTS

| | | |
|---|---|---|
| 3,930,526 A | 1/1976 | Edwards |
| 3,987,833 A | 10/1976 | Powell et al. |
| 4,101,494 A | 7/1978 | Kent et al. |
| 4,139,395 A | 2/1979 | Dunlap |
| 4,867,792 A | 9/1989 | Ronlan |
| 4,895,610 A | 1/1990 | Egan |
| 5,083,596 A | 1/1992 | Kato et al. |
| 5,540,767 A | 7/1996 | Ronlan |
| 5,728,243 A | 3/1998 | Heffernan et al. |
| 5,766,501 A | 6/1998 | Heffernan et al. |
| 5,795,416 A | 8/1998 | Willard, Jr. et al. |
| 6,073,217 A | 6/2000 | Mahalingaiah et al. |
| 6,128,952 A | 10/2000 | LeBlanc |

(Continued)

FOREIGN PATENT DOCUMENTS

| | | | |
|---|---|---|---|
| DE | 19853691 A1 | * | 7/2000 |
| JP | 11248586 A | * | 9/1999 |

OTHER PUBLICATIONS

Machine Translation: JP11-248586; Naruse, Yutaka; No Date.*
Machine Translation: DE19853691; Seitz; No Date.*

*Primary Examiner* — Justin Fischer
*Assistant Examiner* — Kendra Shin
(74) *Attorney, Agent, or Firm* — Wood, Herron & Evans, LLP

(57) ABSTRACT

A self-balancing pneumatic tire is provided having a built-in balancing gel system. In one embodiment, the tire, before cure, includes a green pneumatic tire assembly having an uncured tread defining an outermost layer; a first barrier layer; a second barrier layer situated adjacent the first barrier layer and intermediate the first barrier layer and the tread; and first and second gel precursors. The gel precursors are nonflowable prior to cure but flowable after cure. The gel precursors are respectively contained within spaced-apart first and second circumferential regions defined by confronting, non-contacting surfaces of the first barrier layer and the second barrier layer, each circumferential region further situated proximate opposing sidewalls of the tire and having a width of about 5 percent to about 25 percent of a final tread width obtained upon curing of the uncured tire assembly. In one example, the first and/or second barrier layers can be discontinuous.

16 Claims, 4 Drawing Sheets

(56) References Cited

U.S. PATENT DOCUMENTS

| | | | |
|---|---|---|---|
| 6,129,797 | A | 10/2000 | Heffernan et al. |
| 6,579,389 | B1 | 6/2003 | Kobayashi |
| 6,581,658 | B2 | 6/2003 | Nakajima et al. |
| 6,786,990 | B1 * | 9/2004 | Yamagiwa .................... 156/115 |
| 6,935,391 | B2 | 8/2005 | Naito et al. |
| 7,013,940 | B2 | 3/2006 | Tsihlas |
| 7,022,753 | B2 | 4/2006 | Fogal, Sr. |
| 7,368,024 | B2 | 5/2008 | Majumdar et al. |
| 7,490,644 | B2 | 2/2009 | Yukawa |
| 7,665,495 | B2 | 2/2010 | Tanno et al. |
| 7,703,858 | B2 | 4/2010 | Yukawa |
| 2002/0124921 | A1 | 9/2002 | Nakajima et al. |
| 2003/0150544 | A1 | 8/2003 | Naito et al. |
| 2003/0155055 | A1 | 8/2003 | Leblanc |
| 2003/0205308 | A1 * | 11/2003 | Yamagiwa .................... 152/506 |
| 2005/0159534 | A1 | 7/2005 | Ronlan |
| 2005/0277712 | A1 | 12/2005 | Daly |
| 2006/0001309 | A1 | 1/2006 | Krueger |
| 2007/0044893 | A1 | 3/2007 | Majumdar et al. |
| 2007/0144640 | A1 | 6/2007 | Losey et al. |
| 2007/0175559 | A1 | 8/2007 | Tanno et al. |
| 2008/0135146 | A1 | 6/2008 | Heffernan et al. |
| 2009/0068476 | A1 | 3/2009 | Kirino |
| 2009/0078352 | A1 | 3/2009 | Majumdar et al. |
| 2009/0078353 | A1 | 3/2009 | Majumdar et al. |
| 2009/0084482 | A1 | 4/2009 | Majumdar et al. |
| 2009/0084483 | A1 * | 4/2009 | Majumdar et al. ............ 152/504 |
| 2009/0272471 | A1 | 11/2009 | Bormann |
| 2009/0288750 | A1 | 11/2009 | Majumdar et al. |
| 2010/0006195 | A1 | 1/2010 | Seitz |
| 2010/0101692 | A1 | 4/2010 | Fogal, Sr. et al. |
| 2010/0212811 | A1 | 8/2010 | Seitz |
| 2010/0294406 | A1 * | 11/2010 | Tanno .......................... 152/157 |

* cited by examiner

SELF-BALANCING PNEUMATIC TIRE AND METHOD OF MAKING THE SAME

TECHNICAL FIELD

The present invention is generally directed to pneumatic tires and, more specifically, to self-balancing pneumatic tires and methods of making the same.

BACKGROUND

Pneumatic tires are commonly used on a variety of vehicles, such as passenger automobiles, aircraft, and industrial machinery. It is well known that even a small amount of imbalance in a pneumatic tire mounted to a vehicle can cause undesirable vibration and noise when the tire is rotating at the operating speeds of the vehicle. This imbalance may be attributed to non-uniformities or imperfections in the tire wheel rim, or to imperfections or non-uniformities in the molded tire itself. Such imbalance is particularly noticeable on tires used on aircraft landing gear, due to the high wheel speeds attained during take-off and landing of the aircraft.

One approach to eliminating or reducing the effects of imbalance in formed tires has been to secure discrete patches of rubber material to the tire inner liner, after the tire has been cured, in an effort to offset any imbalances. This approach requires determining the amount and location of imbalance of the formed tire, typically in a dynamic testing machine. Based upon the results of the imbalance testing, a determination is made as to the location and mass of the patch material needed to counteract the imbalance of the tire. The inner surface of the tire is thereafter cleaned at the appropriate location, typically using an organic solvent, and the patch is adhered at the desired location using adhesive material. Rubber patches commonly used for balancing tires are generally provided in fixed weight increments, thereby limiting the precision to which the imbalance may be corrected, and requiring users to maintain an inventory of patches in various sizes. Alternatively, fluidic balancing materials can be applied to the inner surface of the cured tire, where the fluidic balancing materials become more viscous post-application and remain substantially affixed where it had been applied to the inner surface, as described in commonly-assigned U.S. Pat. No. 7,368,024. These fixed weight methods require post-cure processing.

Another conventional system utilizes a free-flowing balancing material, such as glycol and fibers, within the imbalanced tire. The material may be introduced at mounting of a tire on a rim or into an already mounted tire. The tire retains proper balance because the free-flowing material, specifically the minuscule individual elements making up the free-flowing material, inside the tire are distributed by centripetal forces generated by rotation of the wheel/tire in such a way that the free-flowing material balances a heavy spot or a heavy side of the tire assembly. However, when the rotation stops, the material flows under the force of gravity and the process of re-balancing will recommence after every stop. As such, a certain degree of vibration will be felt in the vehicle before the rebalancing is completed. Furthermore, during tire repair or tire retreading, the free flowing material may come out and may need to be refilled.

Accordingly, there remains a need for a self-balancing pneumatic tire, and a method of making the same, that overcomes the aforementioned drawbacks and disadvantages.

SUMMARY

In one embodiment, a self-balancing tire is provided that includes a cured tread having a tread width and defining an outermost layer, and first and second flowable, partially depolymerized gel precursors, which are non-flowable prior to cure. The gel precursors are respectively contained within spaced-apart first and second circumferential regions. The first circumferential region is defined by confronting, non-contacting surfaces of a first barrier layer portion and a second barrier layer portion, and the second circumferential region is defined by confronting, non-contacting surfaces of a third barrier layer portion and a fourth barrier layer portion. Further, the first and the second circumferential regions are situated proximate opposing sidewalls of the tire and each circumferential region has a width from about 5 percent to about 25 percent of the tread width. In one example, the first and the third barrier layer portions, and/or the second and the fourth barrier layer portions define a continuous barrier layer.

In another embodiment, an uncured self-balancing tire assembly is provided that includes an uncured tread defining an outermost layer; and first and second gel precursors, which are non-flowable prior to cure but flowable after cure. The gel precursors are respectively contained within spaced-apart first and second circumferential regions. The first circumferential region is defined by confronting, non-contacting surfaces of a first barrier layer portion and a second barrier layer portion. The second circumferential region is defined by confronting, non-contacting surfaces of a third barrier layer portion and a fourth barrier layer portion. Further, the first and the second circumferential regions are situated proximate opposing sidewalls of the tire and each circumferential region has a width from about 5 percent to about 25 percent of a final tread width. The final tread width is that which is obtained upon curing of the uncured tire assembly. In one example, the first and the third barrier layer portions, and/or the second and the fourth barrier layer portions define a continuous barrier layer.

In yet another embodiment, a method of making a self-balancing tire is provided that includes building spaced apart first and second circumferential regions with each circumferential region containing a gel precursor; and disposing outwardly of the first and second circumferential regions a carcass portion, and then a tread on the carcass to define an uncured tire assembly. The first circumferential region is defined by confronting, non-contacting surfaces of a first barrier layer portion and a second barrier layer portion. The second circumferential region is defined by confronting, non-contacting surfaces of a third barrier layer portion and a fourth barrier layer portion. Each circumferential region has a width from about 5 percent to about 25 percent of a final tread width obtained upon curing the uncured tire assembly. Further, each circumferential region is situated proximate opposing sidewalls of the uncured tire assembly so that the first and second circumferential regions are spaced apart by a distance of about 50 percent or more of the final tread width. In one example, the first and the third barrier layer portions, and/or the second and the fourth barrier layer portions define a continuous barrier layer.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF SPECIFIC EMBODIMENTS

Figure 1:
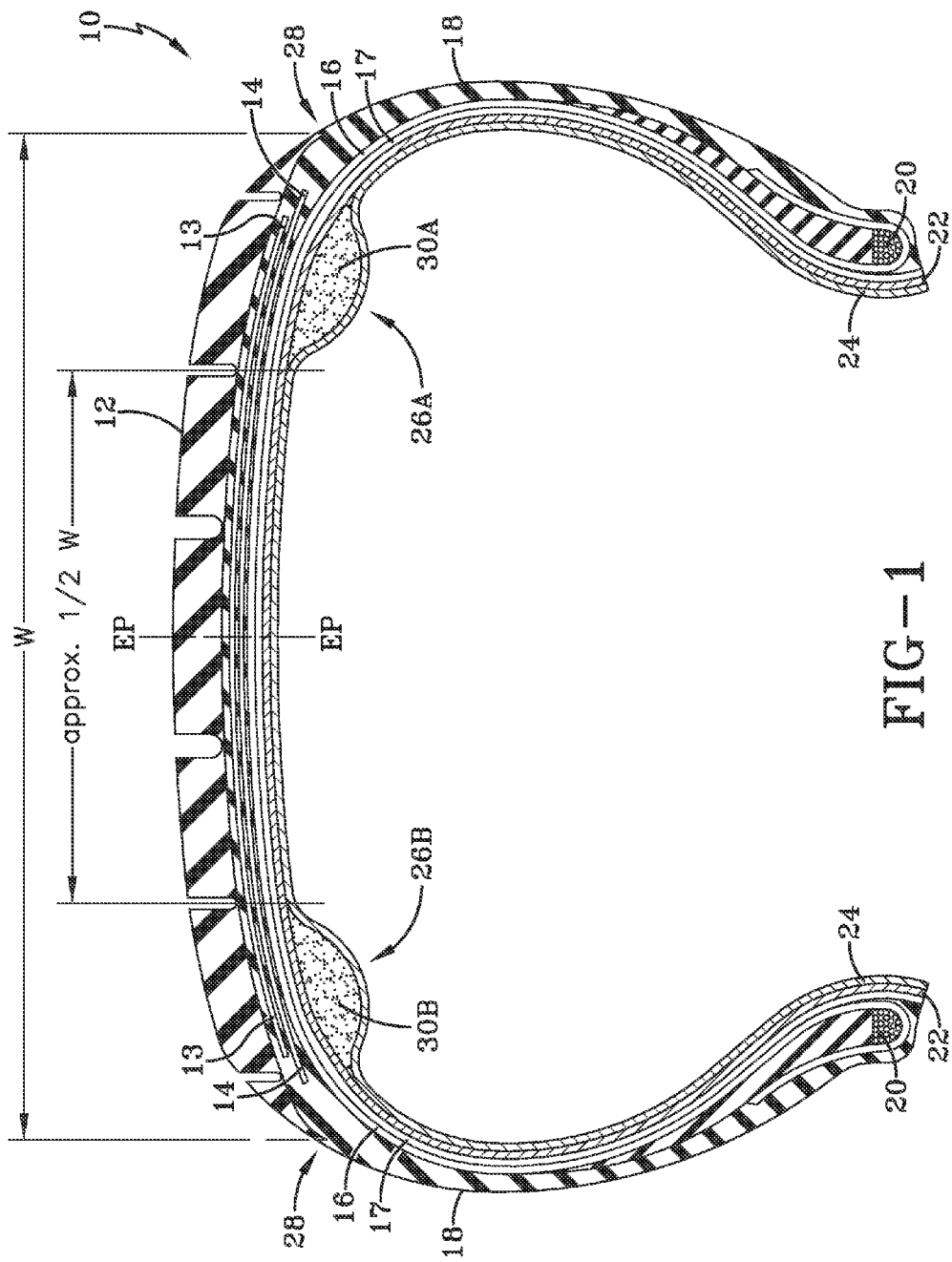
FIG. 1 is a cross-sectional view of a self-balancing tire in accordance with an embodiment of the present invention.

FIG. 1 shows a pneumatic tire 10 that has an ability to balance itself and has the ability to eliminate or reduce the need to secure discrete patches of rubber material to an innermost layer for tire balancing purposes. The tire 10 includes an outer circumferential rubber tread (or tread portion) 12; a supporting carcass, which is made up of belts 13, 14 and radial plies 16, 17; sidewalls 18; inextensible beads 20, a first barrier layer 22, a second barrier layer 24, and spaced-apart first and second circumferential regions 26A and 26B. The circumferential regions 26A, 26B are situated proximate the sidewalls 18 of the tire 10 and near the shoulder region 28, and, respectively contain first and second flowable, partially de-polymerized gel precursors 30A and 30B, which are herein referred to as balancing gels 30A and 30B and which are non-flowable prior to cure.

The individual sidewalls 18 extend radially inward from the shoulder region 28 to join the respective inextensible beads 20 with the tread portion 12. The supporting carcass acts as a supporting structure for the tread portion 12 and sidewalls 18. The first barrier layer 22 is disposed inwardly from the radial plies 16, 17. The first barrier layer 22 is additionally situated adjacent to the the second barrier layer 24, and is thereby sandwiched between the the second barrier layer 24 and the plies 16, 17. The first and second circumferential regions 26A and 26B are defined by confronting, non-contacting surfaces of the first barrier layer 22 and the second barrier layer 24. Each circumferential region 26A, 26B may be further defined by contacting surfaces of the first barrier layer 22 and the second barrier layer 24 that are axially adjacent the respective first and the second circumferential regions 26A, 26B. Each circumferential region 26A, 26B has a width from about 5 percent to about 25 percent of a tread width (W).

Figure 2:
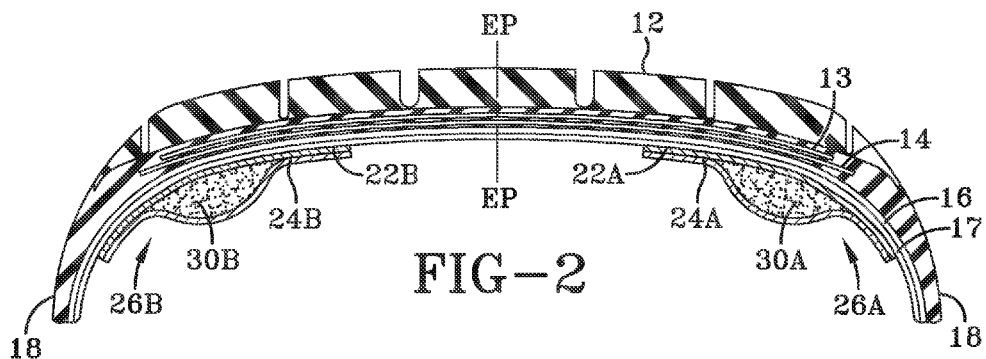
FIG. 2 is a partial cross-sectional view of a self-balancing tire in accordance with another embodiment of the present invention.
Figure 3:
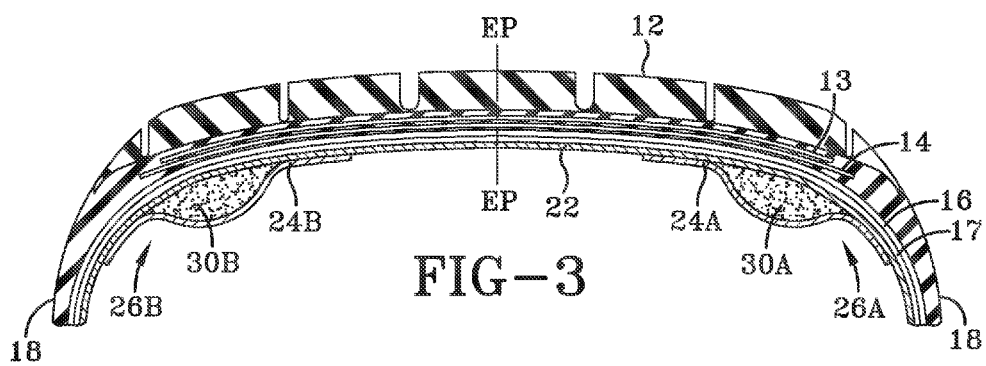
FIG. 3 is a partial cross-sectional view of a self-balancing tire in accordance with another embodiment of the present invention.
Figure 4:
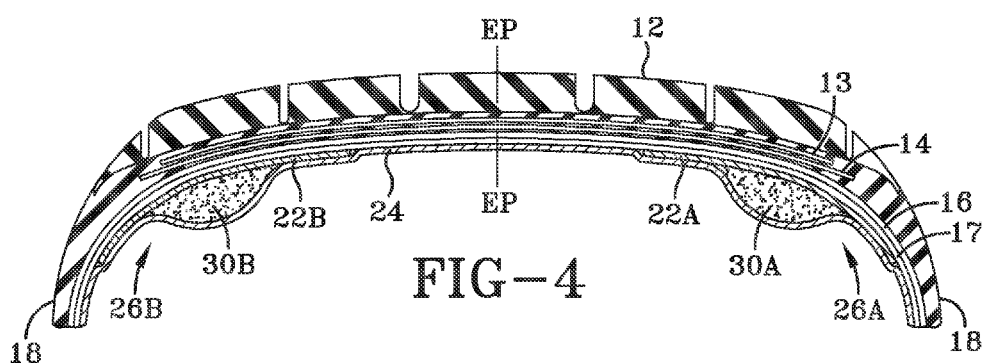
FIG. 4 is a partial cross-sectional view of a self-balancing tire in accordance with yet another embodiment of the present invention.

While the first and second barrier layers 22, 24 are each shown in FIG. 1 as continuous layers that extend from bead to bead, one or both of the first and second circumferential regions 26A, 26B may be discontinuous, or formed using portions thereof, as shown in FIGS. 2-4. For example, as shown in FIG. 2, the first circumferential region 26A may be formed by a first barrier layer portion 22A and a second barrier layer portion 24A, and the second circumferential region 26B is formed by a third barrier layer portion 22B and a fourth barrier layer portion 24B.

Alternative configurations include a combination of barrier layer portions 22A, 22B, 24A, 24B and continuous barrier layers 22, 24. For example, as shown in FIG. 3, the first and second circumferential regions 26A, 26B may be formed by first barrier layer 22, which is a continuous layer, in combination with the second barrier layer portion 24A and the fourth barrier layer portion 24B, respectively, which effectively define a discontinuous second barrier layer 24. In another example, as shown in FIG. 3, the first and second circumferential regions 26A, 26B may be formed by second barrier layer 24, which is a continuous layer, in combination with the first barrier layer portion 22A and the third barrier layer portion 22B, respectively, which effectively define a discontinuous first barrier layer 22.

The first barrier layer 22, as well as the first and second barrier layer portions 22A, 22B, generally includes materials used to inhibit the loss of air pressure in pneumatic tires 10. In one embodiment, the first barrier layer 22, and the first and second barrier layer portions 22A, 22B, can include a rubber compound having natural rubber, synthetic rubber, or combinations or blends thereof. For example, the first barrier layer 22, and the first and second barrier layer portions 22A, 22B, may include a rubber compound that includes a non-butyl general purpose rubber (GPR). In another example, the first barrier layer 22, and the first and second barrier layer portions 22A, 22B, may include a sulfur curative-containing halobutyl rubber composition of a halobutyl rubber, for example, chlorobutyl rubber or bromobutyl rubber. Such halobutyl rubber-based compositions may also contain one or more sulfur curable diene-based elastomers such as, 1,4-polyisoprene natural rubber, 1,4-polybutadiene rubber, and styrene/butadiene rubber, or mixtures thereof. In yet another example, the first barrier layer 22, and the first and second barrier layer portions 22A, 22B, may include a copolymer of isobutylene and isoprene that is produced by incorporating a branching agent, and has a wide molecular weight distribution. Such copolymers contain low molecular weight molecules, which are generally linear, and the high molecular weight molecules, which are star-branched with linear portions radiating from the branching agent.

Additional additives known in the art may also be provided in the rubber compound of the first barrier layer 22, and the first and second barrier layer portions 22A, 22B, to provide a desired compound having desired physical properties. Such known and commonly used additive materials are activators, retarders and accelerators, rubber processing oils, resins including tackifying resins, plasticizers, fatty acids, zinc oxide, waxes, antidegradants, and peptizing agents. The rubber compound may also includes curatives or a cure system so that the composition is vulcanizable and can be prepared by standard rubber compounding methods. As known to those having ordinary skill in the art, depending on the intended use of the barrier layer 22, the additives and curatives are selected and used in conventional amounts.

Further, in yet another embodiment, the first barrier layer 22, and the first and second barrier layer portions 22A, 22B, may include a dynamically vulcanized alloy ("DVA"), which includes at least one engineering resin as a continuous phase and at least one partially vulcanized rubber as a dispersed phase. The DVA can be prepared by generally blending and extruding together the engineering resin and rubber, with curatives, fillers, and plasticizers, utilizing technology known as dynamic vulcanization. The term "dynamic vulcanization" denotes a vulcanization process in which the engineering resin and the rubber are mixed under conditions of high shear and elevated temperature in the presence of a curing agent. The dynamic vulcanization is effected by mixing the ingredients at a temperature which is at or above the curing temperature of the rubber using equipment such as roll mills, Banbury mixers, continuous mixers, kneaders, mixing extruders (such as twin screw extruders), or the like. As a result, the rubber is simultaneously cross-linked and dispersed as fine particles, for example, in the form of a micro-gel, within the engineering resin, which forms a continuous matrix. One characteristic of the dynamically cured composition is that, notwithstanding the fact that the rubber is cured (or at least partially cured), the composition can be processed and reprocessed by conventional thermoplastic processing techniques such as extrusion, injection molding, compression molding, etc.

The engineering resin (also called an "engineering thermoplastic resin," a "thermoplastic resin," or a "thermoplastic engineering resin") can include any thermoplastic polymer, copolymer or mixture thereof including, but not limited to, one or more of the following: a) polyamide resins, such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon Jun. 66, 19610 (N6/66/610), nylon MXD6 (MXD6), nylon 6T (N6T), nylon 6/6T copolymer, nylon 66/PP copolymer, or nylon 66/PPS copolymer; b) polyester resins, such as polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters; c) polynitrile resins, such as polyacrylonitrile (PAN), polymethacrylonitrile, acrylonitrile-styrene copolymers (AS), methacrylonitrile-styrene copolymers, or methacrylonitrile-styrene-butadiene copolymers; d) polymethacrylate resin, such as polymethyl methacrylate, or polyethylacrylate; e) polyvinyl resins, such as ethyl vinyl acetate (EVA), polyvinyl alcohol (PVA), vinyl alchohol/ethylene copolymer (EVOA), polyvinylidene chloride (PVDC), polyvinyl chloride (PVC), polyvinyl/polyvinylidene copolymer, or polyvinylidene chloride/methacrylate copolymer; f) cellulose resins, such as cellulose acetate, or cellulose acetate butyrate; g) fluorine resins, such as polyvinylidene fluoride (PVDF), polyvinyl fluoride (PVF), polychlorofluoroethylene (PCTFE), or tetrafluoroethylene/ethylene copolymer (ETFE); h) polyimide resins, such as aromatic polyimides; i) polysulfones; j) polyacetals; k) polylactones; l) polyphenylene oxide and polyphenylene sulfide; m) styrene-maleic anhydride; n) aromatic polyketones; and o) mixtures of any and all of a) through n) inclusive as well as mixtures of any of the illustrative or exemplified engineering resins within each of a) through n) inclusive.

In one embodiment, the engineering resin includes polyamide resins and mixtures thereof, such as Nylon 6, Nylon 66, Nylon 6 66 copolymer, Nylon 11, and Nylon 12, and their blends. In another embodiment, the engineering resin excludes polymers of olefins, such as polyethylene and polypropylene. In another embodiment, the engineering resin has a Young's modulus of more than 500 MPa and/or an air permeation coefficient of less than $60\times10^{-12}$ cc·cm/cm$^2$ sec cm Hg (at 30° C.). In one example, the air permeation coefficient is less than $25\times10^{-12}$ cc·cm/cm$^2$ sec cm Hg (at 30° C.).

The rubber component of the DVA can include diene rubbers and hydrogenates thereof, halogen containing rubbers, such as a halogenated isobutylene containing copolymers (e.g., brominated isobutylene p-methylstyrene copolymer), silicone rubbers, sulfur-containing rubbers, fluoro rubbers, hydrin rubbers, acryl rubbers, ionomers, thermoplastic elastomers, or combinations and blends thereof.

In one embodiment, the rubber component is a halogen containing rubber. The halogen containing rubber, or halogenated rubber, can include a rubber having at least about 0.1 mole % halogen (e.g., bromine, chlorine or iodine). Suitable halogenated rubbers include halogenated isobutylene containing rubbers (also referred to as halogenated isobutylene-based homopolymers or copolymers). These rubbers can be described as random copolymers of a $C_4$ to $C_7$ isomonoolefin derived unit, such as isobutylene derived unit, and at least one other polymerizable unit. In one example, the halogenated isobutylene-containing rubber is a butyl-type rubber or branched butyl-type rubber, such as brominated versions. Useful unsaturated butyl rubbers such as homopolymers and copolymers of olefins or isoolefins and other types of rubbers suitable for the disclosure are well known and are described in RUBBER TECHNOLOGY 209-581 (Maurice Morton ed., Chapman & Hall 1995), THE VANDERBILT RUBBER HANDBOOK 105-122 (Robert F. Ohm ed., R.T. Vanderbilt Co., Inc. 1990), and Edward Kresge and H. C. Wang in 8 KIRK-OTHMER ENCYCLOPEDIA OF CHEMICAL TECHNOLOGY 934-955 (John Wiley & Sons, Inc. 4th ed. 1993). In one example, the halogen-containing rubber is a halogenated isobutylene-p-methylstyrene-isoprene copolymer or a halogenated poly(isobutylene-co-p-methylstyrene) polymer, which is a brominated polymer that generally contains from about 0.1 to about 5 wt % of bromomethyl groups.

In one embodiment, the rubber has a Young's modulus of more than 500 MPa and/or an air permeation coefficient of less than $60\times10^{-12}$ cc·cm/cm$^2$ sec cm Hg (at 30° C.). In one example, the air permeation coefficient is less than $25\times10^{-12}$ cc·cm/cm$^2$ sec cm Hg (at 30° C.).

In one embodiment, both the rubber component and engineering resin are present in an amount of at least 10% by weight, based on the total weight of the rubber formulation; and the total amount of the rubber component and engineering resin is not less than 30% by weight, based on the total weight of the rubber formulation.

The DVA can also include one or more filler components, which can include calcium carbonate, clay, mica, silica and silicates, talc, titanium dioxide, starch and other organic fillers such as wood flour, and carbon black. In one example, the filler is present from about 20% to about 50% by weight of the total DVA composition.

Additional additives known in the art may also be provided in the DVA to provide a desired compound having desired physical properties. Such known and commonly used additive materials are activators, retarders and accelerators, rubber processing oils, resins including tackifying resins, plasticizers, fatty acids, zinc oxide, waxes, antidegradant, antiozonants, and peptizing agents. As known to those having ordinary skill in the art, depending on the intended use of the DVA, the additives are selected and used in conventional amounts.

Suitable DVAs as well as methods for making DVAs in accordance with embodiments of the present invention are disclosed in U.S. Patent Application Publication Nos. 2008/0314491; 2008/0314492; and 2009/015184, the contents of which are expressly incorporated by reference herein in their entireties. Further examples may be found in U.S. Pat. Nos. 6,359,071, 6,376,598, 6,843,292, 6,861,470 and 6,538,066, Japanese Patent Publication No. JP2006/315,339 and PCT WO 2006/121140.

Specifically with respect to the dynamic vulcanization process itself, the process involves substantially simultaneously mixing and vulcanizing, or cross-linking, at least the one vulcanizable rubber component in a composition that further includes at least the one engineering resin, which is not vulcanizable, using a vulcanizing or curing agent(s) for the vulcanizable component. Suitable curing agents or curatives for the dynamic vulcanization process include, for example, ZnO, CaO, MgO, $Al_2O_3$, $CrO_3$, FeO, $Fe_2O_3$, and NiO, which can be used in conjunction with a corresponding metal stearate complex (e.g., the stearate salts of Zn, Ca, Mg, and Al), or with stearic acid, and either a sulfur compound or an alkylperoxide compound. Accelerators may be optionally added.

Peroxide curatives are to be avoided when the engineering resin(s) chosen are such that peroxide would cause these resins themselves to crosslink, thereby resulting in an excessively cured, non-thermoplastic composition.

The dynamic vulcanization process is conducted at conditions to at least partially vulcanize the rubber component. To accomplish this, the engineering resin, the rubber component and other optional polymers, as well as the cure system, can be mixed together at a temperature sufficient to soften the resin. The mixing process can be continued until the desired level of vulcanization or cross-linking is completed. In one embodiment, the rubber component can be dynamically vulcanized in the presence of a portion or all of the engineering resin. Similarly, it is not necessary to add all of the fillers and oil, when used, prior to the dynamic vulcanization stage. Certain ingredients, such as stabilizers and process aids can function more effectively if they are added after curing. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is typically from about the melting point of the thermoplastic resin to about 300° C., for example.

The resulting DVA is ready to be used as the first barrier layer 22, or first and/or second barrier layer portion 22A, 22B. To that end, the "stock" can be prepared by calendaring or extruding the DVA material into a sheet or film material having a thickness of about 0.1 mm to about 1 mm and cutting the sheet material into strips of appropriate width and length for innerliner application in a particular size or type tire. The first barrier layer 22 may also be provided as a tubular layer. According to one embodiment, in passenger tires, the first barrier layer 22, and/or the first and/or second barrier layer portions 22A, 22B, may have a thickness of about 0.1 mm to about 0.5 mm, whereas for truck tires, the thickness may be about 0.2 mm to about 1 mm, for example. One suitable type of DVA film for use as the first barrier layer 22, and the first and/or second barrier layer portions 22A, 22B, is Exxcore™, which was obtained from ExxonMobil of Houston, Tex.

According to embodiments of the present invention, the second barrier layer 24, or the first and/or second barrier layer portion(s) 24A, 24B, is disposed radially inward of the first barrier layer 22, or the first and/or second barrier layer portion 22A, 22B, and is not required to be the innermost layer of the tire 10. As such, according to embodiments of the present invention, the second barrier layer 24, and the first and/or second barrier layer portions 24A, 24B, may generally include materials used to inhibit the loss of air pressure in pneumatic tires 10, such as those described above for use in the first barrier layer 22, and the first and second barrier layer portion(s) 22A, 22B. Thus, according to one embodiment, the second barrier layer 24, and the first and/or second barrier layer portion(s) 24A, 24B, may include a DVA having a continuous thermoplastic polymer phase which contains a dispersion of at least one partially vulcanized rubber as a dispersed phase, particularly vulcanized rubber with low unsaturation. According to another embodiment, the second barrier layer 24, and the first and/or second barrier layer portion 24A, 24B, is the innermost layer.

If the second barrier layer 24, or the first and/or second barrier layer portion(s) 24A, 24B, demonstrates insufficient ability to adhere to the first barrier layer 22, or the first and/or second barrier layer portion(s) 22A, 22B, one or both of the surfaces thereof may have an adhesive layer added thereon to enhance the cured adhesion of the barrier layer to other tire layers. It should be appreciated that, if desired, one or both surfaces of the first barrier layer 22, or the first and/or second barrier layer portion(s) 22A, 22B, may also have an adhesive layer. The adhesive layer may be tacky in nature and exhibit adequate building tack. Alternatively, the adhesive layer may be non-tacky, such that the adhesive layer does not exhibit extensive building tack, particularly at room temperature (e.g., 23° C.). The adhesive layer aids in adhering the second barrier layer 24 to the first barrier layer 22 by heat activation of the adhesive layer during the curing of the tire assembly at an elevated temperature.

Suitable adhesive layer materials, as well as methods for making an exemplary DVA innerliner with an adhesive layer in accordance with embodiments of the present invention, are disclosed in U.S. Patent Application Publication Nos. 2008/0314491; 2008/0314492; and 2009/0151841. Exemplary adhesives may include a rosin-based resin; a terpene-based resin; a petroleum resin; a cumarin-indene resin; a styrene-based resin; an alkylphenol resin; a polyester polyol/isocyanate-type resin; an acrylic acid ester copolymer/organic peroxide-type resin; a resorcinol-formaldehyde-latex (RFL) resin; a reinforced polyurethane adhesive (RPU) resin; or combinations thereof. The adhesive material may further include a reactive additive that is capable of reacting with the polymeric film and/or its adjacent tire layer. The reactive additive may include one or more reactive functional groups, including but not limited to, hydroxyl and isocyanate. The adhesive may be applied to one or both sides of the polymeric film. The adhesive may be applied in any conventional manner, such as spray coating, dip coating, or extrusion coating. The thickness of the adhesive material coating may be within the range from about 0.1 mil (about 2.5 microns) to about 10 mil (about 250 microns). Such adhesive layers may therefore be referred to in this description as being a "barrier-bonding" layer in that it promotes bonding the second barrier layer 24 to the first barrier layer 22, which facilitates forming the first and second circumferential regions 26A, 26B, as shown in FIG. 1.

Figure 5:
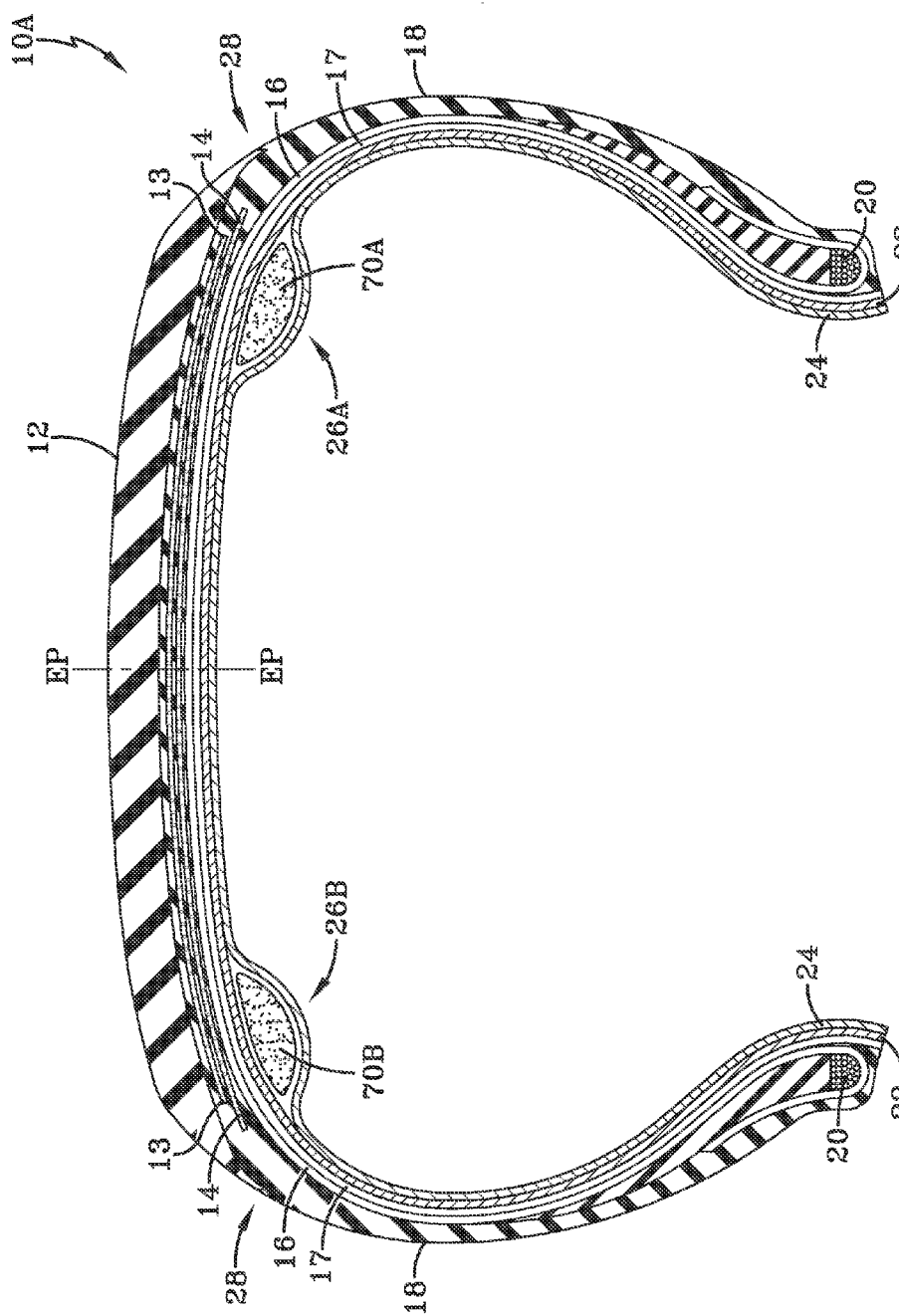
FIG. 5 is a cross-sectional view of the self-balancing tire of FIG. 1 as an uncured self-balancing tire assembly in accordance with an embodiment of the present invention.

The balancing gels 30A, 30B, before curing of the tire, define non-flowable gel precursors 70A and 70B, as shown in FIG. 5. Such gel precursors 70A, 70B are processable similar to that of a conventional rubber composition and can be suitably built, as a rubber-like layer, into a tire using standard tire building techniques. The gel precursors 70A, 70B can generally include any non-flowing or solid material known in the art, which will become flowable under curing conditions, e.g., via thermal degradation or partial de-polymerization. In one example, the precursors are 70A, 70B are self-supporting and include a non-flowing, or non-liquid composition that is neither gel-like nor substantially tacky. Concerning self-supporting, the composition of the gel precursors 70A, 70B should substantially maintain its form, e.g., as a sheet, rod, semi-circle, or bar, during the tire building process. The gel precursors 70A, 70B may be shaped to minimize the amount of airspace trapped between the first barrier layer 22 and the the second barrier layer 24, such as a semi-circle.

In one example, the precursor is a non-flowing, or non-liquid, polyurethane composition that is neither gel-like nor substantially tacky. In another example, the polyurethane gel precursor composition may have a cross-linked density of about 0.160. Cross-link density can be determined using solid state NMR techniques. A non-limiting example of a polyurethane composition suitable for use as the gel precursors 70A, 70B is a methylene diphenyl 4,4'-diisocyanate (MDI) and poly(alkylene oxide) glycol-based composition, which is available from Novex of Wadsworth, Ohio. It should be appreciated that other urethane formulations, which can be used for the gel precursor, can be readily produced by persons having ordinary skill in the art from known chemistry techniques.

The polyurethane compositions for use as the gel precursors 70A, 70B may further include one or more additional components, such as reinforcing filler, e.g., carbon black, silica, coal dust, fibers, microspheres, processing oil, etc. It should be understood by one having ordinary skill in the art that additional components may be included in the gel precursor as desired, such as antidegradants, accelerators, etc., in conventional amounts.

According to another embodiment, the gel precursors 70A, 70B may be a thermally degradable butyl rubber composition. Suitable butyl rubber-based rubber compositions are disclosed in U.S. Pat. No. 6,962,181 and U.S. Patent Application Publication No. 2009/0084483, both of which are expressly incorporated by reference herein in their entirety.

The butyl rubber-based gel precursor can include a peroxide and a dispersion therein of a particulate pre-cured rubber selected from a resin-cured butyl rubber. In one example, based upon parts by weight per 100 parts by weight of said butyl rubber, the butyl rubber-based rubber composition can include a copolymer of isobutylene and isoprene, wherein the copolymer contains from about 0.5 units to about 5 units derived from isoprene, and correspondingly from about 95 weight percent to about 99.5 weight percent units derived from isobutylene. The butyl rubber that can be employed may typically have a number average molecular weight, for example, in the range of 200,000 to 500,000. Such butyl rubber and its preparation is well known to those having skill in such art.

The butyl rubber composition generally further has a sufficient amount of organoperoxide to cause the butyl rubber to partially depolymerize, usually in a range of from about 0.5 to about 20 phr of the active organoperoxide depending somewhat upon the duration and temperature of the tire curing operation and the degree of depolymerization desired. For example, a butyl rubber composition having from about 6 to about 14 phr of active organoperoxide may be cured from about 130° C. to about 180° C. for a duration of about 15 to about 35 minutes to provide the balancing gel 30.

Various organoperoxides may be used such as those that become active (e.g. generate free radicals) at high temperatures, that is, above about 100° C. Such organoperoxides are referred to herein as active peroxides. Examples of such organoperoxides are, for example, tertbutyl perbenzoate and dialkyl peroxides with the same or different radicals, such as dialkylbenzene peroxides and alkyl pre-esters. In one example, the active peroxide will contain two peroxide groups. In another example, the peroxide groups are attached to a tertiary butyl group. The basic moiety on which the two peroxide groups are suspended can be aliphatic, cycloaliphatic, or aromatic radicals. Some representative examples of such active organoperoxides are, for example, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy)hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy)hexane. Other suitable active peroxides may be found in P. R. Dluzneski, "Peroxide vulcanization of elastomers", Rubber Chemistry and Technology, Vol. 74, 451 (2001), which is expressly incorporated by reference herein in its entirety.

The peroxide can be added to the butyl rubber composition in pure form (100 percent active peroxide) or on an inert, free-flowing mineral carrier. Silicon oil is an inert mineral carrier often utilized for this purpose. Such carrier composition containing from about 35 weight percent to 60 weight percent active ingredient (peroxide) can be employed. For example, 40 percent by weight dicumylperoxide on an inert carrier can be employed as the peroxide agent in the butyl rubber composition layer.

The butyl rubber-based rubber composition may further include particulate fillers, such as carbon black, fibers, and/or hollow glass microspheres. It is also to be understood that other known fillers and/or reinforcing agents, such as silica and calcium carbonate, can be substituted for part of the carbon black in this composition. The fillers assist in the modulating the viscosity of the balancing gel 30 after the partial depolymerization of the butyl rubber-based gel precursor.

In one example, the butyl rubber-based composition includes the ingredients shown in Table 1.

TABLE 1

| Butyl rubber-based gel precursor composition. | | |
| --- | --- | --- |
| Component | Stage | Amount (phr) |
| Non-productive 1 (NP1) | | |
| Butyl rubber | NP1 | 100.00 |
| Medium processing oil | NP1 | 3.00 |
| Silica | NP1 | 20.00 |
| Clay | NP1 | 10.00 |
| Titanium dioxide | NP1 | 2.0 |
| Dusting agent | NP1 | 0.5 |
| Total | | 136.5 |
| Productive 1 (P1) | | |
| Peroxide[1] (40%) | P1 | 12.00 |
| Total | | 148.50 |

[1]Link-Cup ® NBV40C available from GEO Specialty Chemicals of Gibbstown, NJ; chemical name: n-butyl-4,4-di(tert-butylperoxy)valerate, 40% supported on calcium carbonate.

The various components of the gel precursor 70A, 70B, prior to building the tire 10, can be mixed together using conventional rubber mixing equipment, particularly an internal rubber mixer. For example, butyl rubber and polyurethane compositions used in the gel precursors 70A, 70B generally have sufficient viscosity, i.e., are not free-flowing, and have enough tack to enable incorporation into an unvulcanized tire, without substantially departing from standard tire building techniques and without the use of complicated, expensive tire building equipment.

Material permitting, the gel precursors 70A, 70B, prior to building of the tire 10, may be formed into sheet stock that can be cut into strips and then appropriately positioned on a tire building apparatus, such as a tire drum, during the tire build-up process. Alternatively, during the tire building process, the gel precursors 70A, 70B, may be extruded with a hand-held extruder directly onto the second barrier layer 24. The tire building process is described in detail further below.

The tire belts 13, 14 and radial plies 16, 17 generally may be those conventionally used in making tire carcasses in pneumatic tires 10. The remainder of the tire components, e.g., tire tread 12, sidewalls 18, and reinforcing beads 20, also generally may be selected from those conventionally known in the art. The tire carcass, tire tread 12, and beads 20 and their methods of preparation are well known to those having skill in such art.

Figure 6:
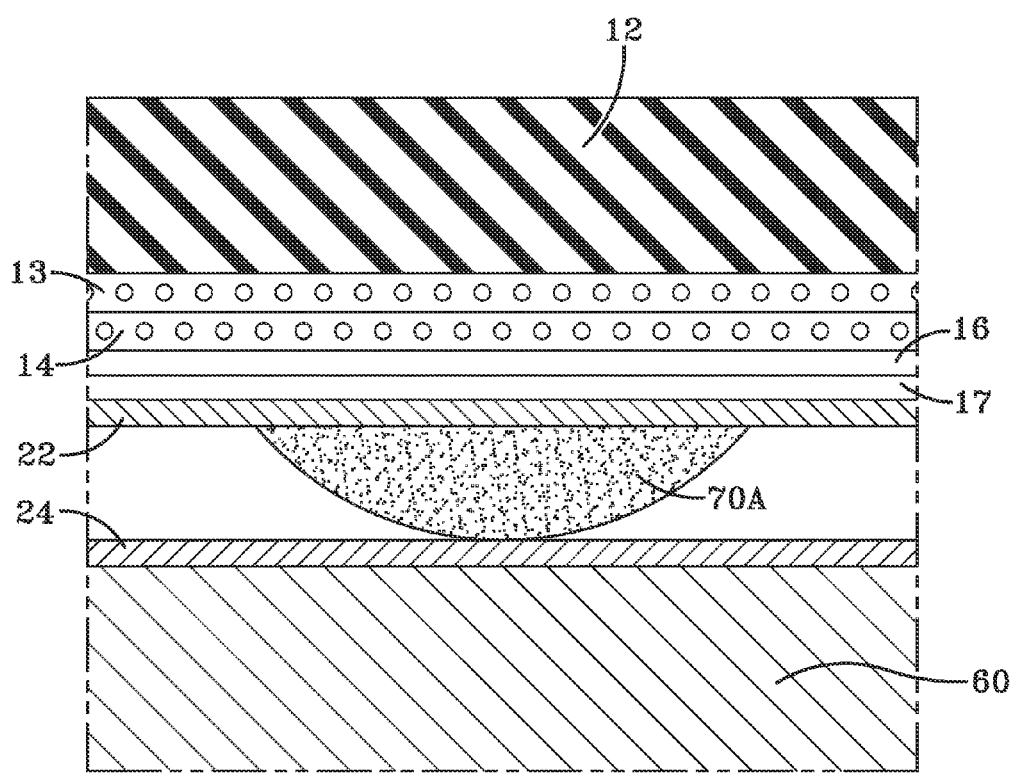
FIG. 6 is a partial cross-sectional view of a circumferential region with gel precursor of the uncured tire assembly of FIG. 5 as situated on a tire building apparatus in accordance with an embodiment of the present invention.

The pneumatic tire of FIG. 1 may be prepared, as best shown in FIG. 5, by building the gel precursors 70A, 70B into an uncured self-balancing tire assembly 10A using conventional tire building techniques. More specifically, as shown in FIG. 6, the second barrier layer 24 is first situated or positioned on the tire drum 60, such as by being wrapped therearound, with the remainder of the uncured self-balancing tire assembly 10A being subsequently built thereon. The tire drum may be modified to provide a space to accommodate the general shape and/or size (not shown) of the gel precursor (e.g. 70A, 70B). The thickness of the second barrier layer 24 can vary in the uncured self-balancing tire assembly 10A. Generally, the thickness may range from about 0.05 cm (0.02 inches) to about 0.5 cm (0.20 inches).

With continuing reference to FIGS. 5 and 6, the gel precursors 70A, 70B are positioned on the second barrier layer 24. The gel precursors 70A, 70B may be formed into a strip or layer prior to building the tire by using conventional equipment such as a calendar, extruder, or any combination thereof. Alternatively, the gel precursors 70A, 70B may be shaped/formed during the tire building process. For example, the gel precursors 70A, 70B may be extruded with a hand extruder directly onto the second barrier layer 24 in the shape of a semi-circle. The width of the strip or the layer of gel precursors 70A, 70B may be based on the final tread width W of the cured tire 10. For example, the gel precursor may have a width from about 5 percent to about 25 percent, from about 7 percent to about 23 percent, or from about 10 percent to about 20 percent of the final tread width W. Alternatively, the width may be based on a width of the belt 14, which is typically about 90-95 percent of the tread width (W).

The thickness of the gel precursors 70A, 70B is dependent on various considerations, such as on the amount of balancing gels 30A, 30B that is ultimately desired in the cured tire 10, and the shape and/or the width of the strip of gel precursors 70A, 70B. As such, the thickness of the gel precursor strip may vary in the uncured self-balancing tire assembly 10A. Generally, the thickness may range from about 0.08 cm (0.03 inches) to about 2.67 cm (1.05 inches). In passenger tires, the gel precursors 70A, 70B may have a thickness of about 0.32 cm (0.125 inches) whereas for truck tires, the gel precursors 70A, 70B may have a thickness of about 0.76 cm (0.3 inches).

The gel precursor is generally situated in the shoulder region 28 of the uncured self-balancing tire assembly 10A. According to one embodiment, the first and second gel precursors 70A, 70B are situated in the shoulder region 28, proximate where the opposing sidewalls will be located in the cured tire 10, and spaced apart thereby leaving a vacancy in the central portion of the tread. For example, the first and second gel precursors 70A, 70B may be spaced apart by a distance equal to 50 percent, 60 percent, 70 percent, 80 percent or more of the tread width W.

Finally, barrier layer 22, is situated, or disposed outwardly, of the gel precursors 70A, 70B followed by the radial plies 16 and 17, belts 13 and 14, and then the tire tread 12, which is positioned on the belt 13, thereby defining the uncured self-balancing tire assembly 10A.

After the uncured self-balancing tire assembly 10A is assembled, the assembly 10A is shaped and cured using a normal tire cure cycle. During curing, the composition of the gel precursors 70A, 70B is transformed to a flowable gel-like, partially de-polymerized gel precursors or balancing gels 30A, 30B, along with a small amount of gaseous by-product, thereby providing the pneumatic tire 10 with self-balancing properties.

Generally, the assembly 10A may be cured over a wide temperature range. For example, passenger tires may be cured at a temperature ranging from about 130° C. to about 170° C. and truck tires might be cured at a temperature ranging from about 150° C. to about 180° C. Thus, a cure temperature may range, for example, from about 130° C. to about 180° C. and for a desired period of time. For example, an uncured self-balancing tire assembly 10A may be cured in a suitable mold at a temperature in a range of from about 150° C. to about 175° C. for a sufficient period of time to partially de-polymerize the butyl rubber or thermally degrade non-flowing polyurethane that is neither gel-like nor flowable, for example, thereby forming a built-in balancing gel, which provides self-balancing properties to the cured tire 10. Additionally, during the curing process, the the second barrier layer 24 adheres to the barrier layer 22, except for the region occupied by the gel precursors 70A, 70B, thereby forming spaced-apart first and second circumferential regions 26A, 26B via confronting, non-contacting surfaces of the first barrier layer 22 and the second barrier layer 24.

Thus, after curing, self-balancing tire 10 is provided. Upon rotation of the tire 10 about a central axis, the now flowable balancing gels 30A, 30B may be influenced by centrifugal forces to redistribute the mass of the flowable balancing gel 30A, 30B throughout the circumferential regions 26A, 26B to provide a balanced tire. Concerning "flowable", the balancing gels 30A, 30B should be capable of flowing under a centrifugal force that exists when the tire is rotating. However, according to one embodiment, the balancing gels 30A, 30B do not flow under the mere force of gravity.

Non-limiting examples of test pieces of the uncured tire assembly 10A with gel precursors 70A, 70B in accordance with the detailed description are now disclosed below. These examples are merely for the purpose of illustration and are not to be regarded as limiting the scope of the invention or the manner in which it can be practiced. Other examples will be appreciated by a person having ordinary skill in the art.

EXAMPLES

Examples 1-5

A green adhesion test piece was prepared of a halobutyl barrier layer, which included a rubber formulation having 80 parts brominated butyl rubber, 20 parts natural rubber, 62.5 phr carbon black, 5 phr zinc oxide, 18 phr processing oil and 1.7 phr of accelerator/curatives/and antioxidants/processing aids. Five different strips of gel precursors were stitched side by side on the green adhesion test piece (6" by 6') and covered with a 6" by 6" by 0.011" piece of Exxcore™ DVA innerliner with the adhesive side facing the gel precursors. Example 1 was a ¼"×3"×0.125" strip of polyurethane having a cross-link density of 0.16 (Novex, Inc.); and Examples 2-5 were ¼"×3" strips of a butyl compound having a thickness of 0.03", 0.06", 0.09", and 0.12", respectively. For Examples 2-5, 100 parts butyl rubber gel precursor compounded with peroxide loading of about 12 phr was prepared, with the butyl gel precursor having a 5% G' of 0.244 MPa.

The test piece was cured for 30 minutes at 150° C. and 100 psi with the bladder side touching the Exxcore™ DVA. After curing, each strip of gel precursor was contained within regions of confronting, non-contacting surfaces of the adhesion test piece and Exxcore™ DVA innerliner and could be squeezed from one end to another. The individual flowable strips were well separated due to the strong bonding of the Exxcore™ DVA (adhesive side) to the Strebler piece. A test of the polyurethane gel revealed a reduced degree of cross-linking, produced from the curing conditions, from an initial cross-link density of 0.160 to 0.126, which is about a 21% decrease. A test of the butyl gels revealed a decrease in the G', caused by the curing conditions, from an initial G' of 0.244

MPa to 0.015 MPa. All thicknesses of the butyl rubber gel precursors (Examples 2-5) were rendered free-flowing upon curing.

Examples 6-10

The above experiment was performed again, except that the Exxcore™ DVA was replaced by another layer of a halobutyl barrier layer. A 6"×6"×0.030" of the halobutyl barrier layer was placed on top of the gel precursors without using any adhesive.

The test piece was cured for 30 minutes at 150° C. and 100 psi. After curing, each strip of gel precursors was contained within a region of confronting, non-contacting surfaces of the adhesion test piece and the halobuyl barrier layer and could be squeezed from one end to another. The individual flowable strips were again well-separated due to the strong bonding of the halobuyl barrier layer to the adhesion test piece. Similar to Examples 2-5, Examples 4-10 were each rendered free-flowing upon curing.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A self-balancing tire comprising:
   a cured tread having a tread width and defining an outermost layer; and
   first and second flowable, partially de-polymerized gel precursors, which are non-flowable prior to cure, the gel precursors respectively contained within spaced-apart first and second circumferential regions,
     wherein the first circumferential region is defined by confronting, non-contacting surfaces of a first barrier layer portion and a second barrier layer portion, wherein the second circumferential region is defined by confronting, non-contacting surfaces of a third barrier layer portion and a fourth barrier layer portion, wherein the first and the third barrier layer portions define a first continuous barrier layer, wherein the second and the fourth barrier layer portions define a second continuous barrier layer, wherein the first and second circumferential regions define the only regions in the tire with the gel precursors, and wherein the first and the second circumferential regions are further situated proximate opposing sidewalls of the tire and each circumferential region having a width from about 5 percent to about 25 percent of the tread width.

2. The tire of claim 1, wherein at least one of the gel precursors comprise a butyl rubber-based rubber composition, a polyurethane-based composition, or a combination thereof.

3. The tire of claim 1, wherein at least one of the gel precursors is a polyurethane-based composition.

4. The tire of claim 1, wherein at least one of the gel precursors is a butyl rubber-based rubber composition.

5. The tire of claim 1, wherein at least a portion of the first and the third barrier layer portions and/or at least a portion of the second and the fourth barrier layer portions define a contacting surface adjacent the respective first and the second circumferential regions, and wherein the contacting surface of at least one of the first barrier layer, the second barrier layer, the third barrier layer and/or the fourth barrier layer portions includes an adhesive layer.

6. The tire of claim 1, wherein each circumferential region has a width from about 10 percent to about 20 percent of the tread width.

7. The tire of claim 1, wherein the first and second circumferential regions are spaced-apart at a distance of about 50 percent or more of the tread width.

8. An uncured self-balancing tire assembly comprising:
   an uncured tread defining an outermost layer; and
   first and second gel precursors, which are non-flowable prior to cure but flowable after cure, the gel precursors respectively contained within spaced-apart first and second circumferential regions,
     wherein the first circumferential region is defined by confronting, non-contacting surfaces of a first barrier layer portion and a second barrier layer portion, wherein the second circumferential region is defined by confronting, non-contacting surfaces of a third barrier layer portion and a fourth barrier layer portion, wherein the first and the third barrier layer portions define a first continuous barrier layer, wherein the second and the fourth barrier layer portions define a second continuous barrier layer, wherein the first and second circumferential regions define the only regions in the tire with the gel precursors, and wherein the first and the second circumferential regions are further situated proximate opposing sidewalls of the tire and each circumferential region having a width from about 5 percent to about 25 percent of a final tread width obtained upon curing of the uncured tire assembly.

9. The tire assembly of claim 8, wherein at least one of the gel precursors comprise a butyl rubber-based rubber composition, a polyurethane-based composition, or a combination thereof.

10. The tire assembly of claim 8, wherein at least one of the gel precursors is a polyurethane-based composition.

11. The tire assembly of claim 8, wherein at least one of the gel precursors is a butyl rubber-based rubber composition.

12. The tire assembly of claim 8, wherein at least a portion of the first and the third barrier layer portions and/or at least a portion of the second and the forth barrier layer portions define a contacting surface adjacent the respective first and the second circumferential regions, and wherein the contacting surface of at least one of the first barrier layer, the second barrier layer, the third barrier layer and/or the fourth barrier layer portions includes an adhesive layer.

13. The tire assembly of claim 8, wherein each circumferential region has a width from about 10 percent to about 20 percent of the final tread width.

14. The tire assembly of claim 8, wherein the first and second circumferential regions are spaced-apart at a distance of about 50 percent or more of the final tread width.

15. A method of making a self-balancing tire comprising:
   building spaced apart first and second circumferential regions with each circumferential region containing a gel precursor, wherein the first circumferential region is defined by confronting, non-contacting surfaces of a first barrier layer portion and a second barrier layer portion, and wherein the second circumferential region is defined by confronting, non-contacting surfaces of a third barrier layer portion and a fourth barrier layer portion, wherein the first and the third barrier layer portions define a first continuous barrier layer, wherein the second and the fourth barrier layer portions define a second continuous barrier layer, wherein the first and second circumferential regions define the only regions in the tire with the gel precursors; and disposing outwardly of the first and second circumferential regions a carcass portion, and then a tread on the carcass to define an uncured tire assembly, wherein each circumferential region has a width from about 5 percent to about 25 percent of a final tread width obtained upon curing the uncured tire assembly, wherein each circumferential region is situated proximate opposing sidewalls of the uncured tire assembly with the first and second circumferential regions being spaced apart by a distance of about 50 percent or more of the final tread width.

16. The method of claim 15 further comprising:

curing the uncured tire assembly under conditions of heat and pressure such that the gel precursors are transformed to flowable, partially de-polymerized gel precursors so as to provide the cured tire with self-balancing properties.

\* \* \* \* \*